United States Patent [19]
Harrington

[11] Patent Number: 5,231,695
[45] Date of Patent: Jul. 27, 1993

[54] GENERALIZED CLIPPING IN AN EXTENDED FRAME BUFFER

[75] Inventor: Steven J. Harrington, Holley, N.Y.

[73] Assignee: Xerox Corporation, Stamford, Conn.

[21] Appl. No.: 574,052

[22] Filed: Aug. 29, 1990

[51] Int. Cl.$^5$ .............................................. G06F 15/72
[52] U.S. Cl. .................................. 395/134; 395/133; 382/25
[58] Field of Search ................ 395/133, 134; 340/747, 340/750; 382/25, 26

[56] References Cited

U.S. PATENT DOCUMENTS

| | | | |
|---|---|---|---|
| 3,816,726 | 6/1974 | Sutherland et al. | 235/152 |
| 4,492,956 | 1/1985 | Collmeyer et al. | 340/723 |
| 4,623,880 | 11/1986 | Bresenham et al. | 340/723 |
| 4,698,779 | 10/1987 | Holden et al. | 364/520 |
| 4,815,009 | 3/1989 | Blatin | 364/518 |
| 4,881,130 | 11/1989 | Hayashi | 358/443 |
| 4,888,712 | 12/1989 | Barkans et al. | 364/522 |
| 4,906,986 | 3/1990 | Takeda | 340/799 |
| 5,125,074 | 6/1992 | Labeaute et al. | 395/121 |

Primary Examiner—Phu K. Nguyen
Attorney, Agent, or Firm—Oliff & Berridge

[57] ABSTRACT

In a generalized clipping operation, both the objects being drawn and the clipping region are represented as generalized polygons with a non-zero winding number. An object may be entered and clipped by simply tracing its boundary and the clipping region boundary. This tracing may be done by stepping along the edge segments using a curve generation algorithm. Intersections are determined by simply noting whether both clipping boundary and object boundary lie on the same pixel. The time necessary to construct the clipped object is proportional to the length of the object boundary, plus the length of the clipping boundary.

4 Claims, 9 Drawing Sheets trace the clipping boundary, drawing lines according to the object winding number trace the object boundary, drawing lines according to the clipping winding number

FIG. 3a trace the clipping boundary, drawing lines according to the object winding number

FIG. 3b trace the object boundary, drawing lines according to the clipping winding number

FIG. 3c clipping region
object

FIG. 4a trace the clipping boundary, drawing lines according to the object winding number

FIG. 4b trace the object boundary, drawing lines according to the clipping winding number

FIG. 4c resulting winding numbers

```
ch  ch  ch  ch  ch  ch  ch  ch
cd                          cu
cd                          cu
cd                          cu
cd                          cu
cd                          cu
cd  ch  ch  ch  ch  ch  ch  cu    Step 1: enter the clipping boundary
```

FIG. 8a

```
ch  ch  ch  ch  ch  ch  ch  ch
cd                          cu
cd          oh  oh  oh  cu/oh  oh  oh  oh
cd              od          cu              ou
cd              od  oh  oh  cu/oh  oh  oh  ou
cd                          cu
cd  ch  ch  ch  ch  ch  ch  cu    Step 2: enter the object boundary
```

Step 3: Trace the clipping boundary entering u or d states according to the object winding number

Step 4: Trace the object boundary entering u or d states according to the clipping winding number. Remove the object boundary

Step 5: Remove the clipping boundary

| (  | u  | )  |    |    |
|----|----|----|----|----|
| (  | u  | u  | )  |    |
| (  | u  | u  | u  | )  |

FIG. 9a

| (u) |    |    |
|-----|----|----|
| (u  | u) |    |
| (u  | u  | u) |

FIG. 9b

| (u) |    |    |
|-----|----|----|
| (u  | x) |    |
| (u  | u  | x) |

GENERALIZED CLIPPING IN AN EXTENDED FRAME BUFFER

CROSS-REFERENCES TO RELATED APPLICATIONS

Co-pending U.S. patent application Ser. Nos. 07/574,143 filed Aug. 29, 1990 now abandoned, entitled "Conversion from Odd to Non-Zero Winding Number Specification Using an Extended Frame Buffer", by the same inventor (JAO 26267), and 07/363,827, entitled "Representation of Polygons Defined by Non-Zero Winding Numbers" filed on Jun. 9, 1989 are herein incorporated by reference.

BACKGROUND OF THE INVENTION

1. Field of the Invention

The present invention relates to generalized clipping in an extended frame buffer and, more particularly, to clipping by tracing the boundary of an object to be clipped and the boundary of the clipping region.

2. Description of the Related Art

Clipping is a common and useful operation in computer graphics. It can, for example, allow the computer to model a large and complex "world" of graphical objects, and present to the user only that portion which is of current interest. Clipping is the technique of displaying only the portion of an image which lies within some boundary. Those areas of the image which fall outside the boundary are said to be clipped away. There is a fair body of research into techniques for fast clipping, most of it oriented towards clipping to a rectangular boundary aligned with the coordinate axes. Also, some of the techniques are designed for clipping line segments (or vectors) rather than solid areas, such as polygons. However, there are methods which will clip polygon objects which can be generalized to clipping regions which are convex polygons.

Modern page description languages specify areas which can be bounded not only by line segments, but also by conic- or cubic-curve segments. These generalized polygons can be used to describe shapes to be filled with some color or regions for clipping. This generalized clipping problem has been handled by first approximating the curved segments in both the clipping region, and the region being clipped by a number of small line segments. The clipping region is then decomposed into convex areas (usually rectangles or trapezoids). Using these areas, known clipping techniques can be applied. Usually, the boundary segments of the object being clipped and the clipping regions are sorted (for example, into scanline order), so that it is easy to tell which segments might intersect which clipping areas, and the cost of checking all segments against all clipping regions can be avoided.

The related art has disclosed devices employing clipping to display only the portion of an image which lies within some boundary.

U.S. Pat. No. 4,698,779 to Holden et al discloses a graphic display with determination of coincidence of subject and clip area wherein a method to calculate an intersection between two lines using algebra is shown. A means is disclosed to detect an intersection between a subject region and a clip region.

U.S. Pat. No. 4,815,009 to Blatin discloses an algorithm for filling an image outline wherein a winding number is used to keep track of an outline of a polygon. An algorithm is provided which fills a polygon using a winding number system.

U.S. Pat. No. 3,816,726 to Southerland et al discloses a computer graphics clipping system for polygons which performs a clipping function in a three dimensional space. A line is clipped using several claims as references. A means is disclosed to calculate an intersection point between a plane and a polygon.

U.S. Pat. No. 4,623,880 to Bresenham et al discloses a graphics display system and method having an improved clipping technique which calculates an intersection between a clipping region and a subject region. An end point of a line is clipped if that end point is outside a view port. A system of vectors is used to define a clipping area.

U.S. Pat. No. 4,492,956 to Collmeyer et al discloses a graphics display system and method including a preclipping circuit wherein a hardware system is described for clipping. The system uses vector notation to keep track of lines and their intersections.

U.S. Pat. No. 4,906,986 to Takeda discloses a guard band clipping method for three dimensional graphics display systems wherein triangular polygons are used to represent a three dimensional space. In order to reduce the number of necessary clippings, a guard band is created around a clipping region. Before a polygon is clipped, it is sorted into one of four classes to determine if clipping is necessary. A method of determining whether or not a polygon should be clipped is shown.

U.S. Pat. No. 4,881,130 to Hayashi discloses an image editing system for an image recording apparatus wherein a particular region within a window is selected using a polygon. The polygon can be of any shape since a vector is used to define the polygon's boundary.

U.S. Pat. No. 4,888,712 to Barkans et al discloses a display control device wherein a frame buffer is used to store a boundary of an object. The frame buffer allows a user to fill in the background of a screen with a certain pattern which is repeated over and over again. Several methods of storing a pattern shown.

It would be desirable to perform a generalized clipping operation in a quick and efficient manner. It would further be desirable to perform the generalized clipping on a plurality of boundary shapes. These aspects are not addressed in the patents discussed above.

OBJECTS AND SUMMARY OF THE INVENTION

Accordingly, one object of the present invention is to cleanly and efficiently provide clipping of a region bounding an object.

Another object of the present invention is to provide clipping to any of a plurality of boundary shapes.

A further object of the present invention is to provide clipping for use with shapes defined by a non-zero winding number.

To achieve the foregoing and other objects, and to overcome the shortcomings discussed above, a clipping operation is described which can handle the generalized clipping problem much more cleanly and efficiently. The operation is based on the extended frame buffer described in copending U.S. patent application Ser. No. 07/363,827 filed Jun. 9, 1989 now U.S. Pat. No. 5,043,711, the disclosure of which is herein incorporated by reference. The extended frame buffer allows filled areas to be represented by generalized polygons, and a non-zero winding number convention. A point is interior to the shape if its winding number is non-zero.

This representation allows objects to be entered into the frame buffer by simply entering their boundaries. Odd winding conventions can be converted to non-zero winding number conventions as described in copending U.S. application Ser. No. 07/574,143 filed Aug. 29, 1990 now abandoned, the disclosure of which is herein incorporated by reference. In the clipping operation, both the objects being drawn and the clipping region are represented as generalized polygons with a non-zero winding number. An object may be entered and clipped by simply tracing its boundary and the clipping region boundary. The tracing may be done by stepping along the edge segments using a curve generation algorithm. There is no need to approximate curved segments with a plurality of straight lines, to decompose the clipping area into convex regions, to sort clipping regions or edge segments or to calculate the intersection of line segments, the calculation being the major cost in many conventional algorithms which must determine where an edge segment crosses the clipping boundary. In the clipping operation, intersections are determined by simply noting whether both clipping boundary and object boundary lie on the same pixel. The time necessary to construct the clipped object is proportional to the length of the object boundary plus the length of the clipping boundary.

BRIEF DESCRIPTION OF THE DRAWINGS

The invention will be described in detail with reference to the following drawings in which like reference numerals refer to like elements and wherein.

DETAILED DESCRIPTION OF THE PREFERRED EMBODIMENTS

Figure 1:
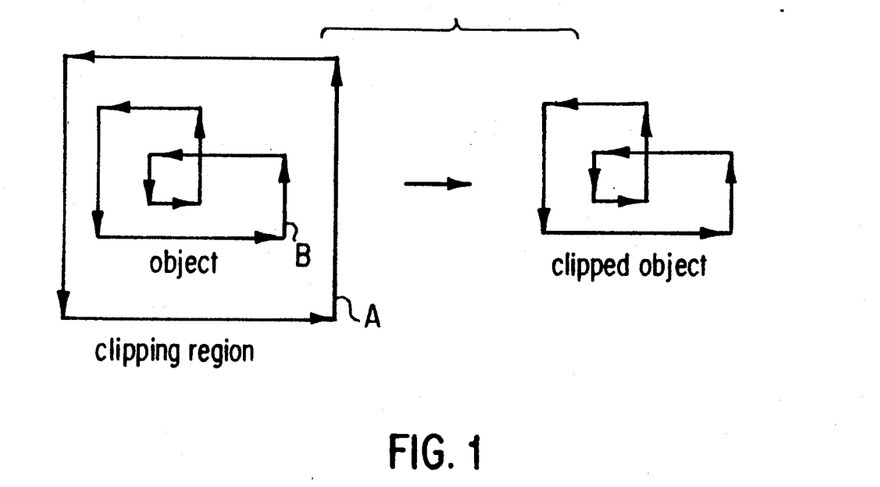
FIG. 1 illustrates clipping of a shape enclosed by a simple rectangular clipping region.
Figure 2:
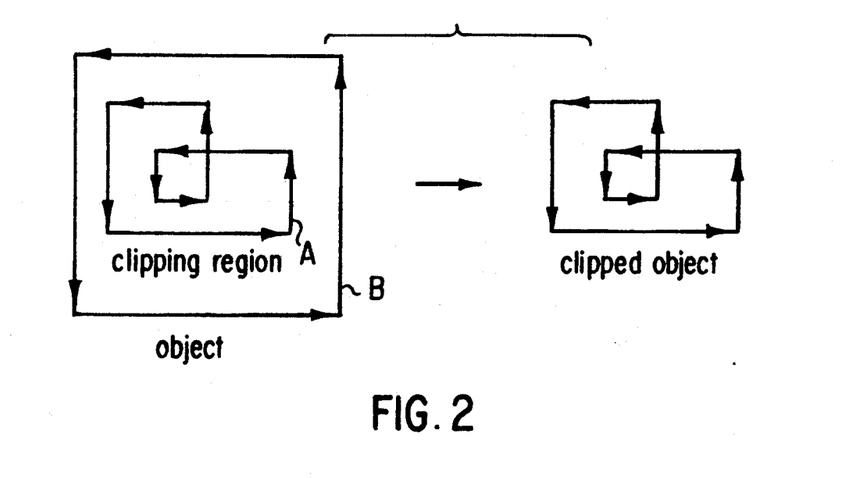
FIG. 2 illustrates a simple shape clipped by a complex clipping region.

Referring now to the drawings, and particular to FIGS. 1 and 2 thereof, the clipping of objects using regions defined by a non-zero winding number is illustrated. The interior of the clipped region should be that area which is interior to both the original object region and to the clipping region. If a point has a positive winding number with respect to both the original shape and the clipping boundary, then its winding number should be positive with respect to the final clipped shape. If, however, the winding number is zero, with respect to either the original shape or the clipping region, then the winding number of the clipped region should be zero. Note the symmetry between object and clipping region.

The result of clipping region A applied to shape B as shown in FIG. 1 is the same as clipping shape B to clipping region A as shown in FIG. 2. It is expected that a shape which is totally enclosed by a simple clipping region, such as a rectangle, would be unchanged by the clipping.

By symmetry, a simple shape is expected, if clipped by a complex clipping region containing areas with winding number greater than 1, to yield a result with the winding number structure of the clipper.

A definition of clipping which satisfies these properties is that the winding number of a point for the clipped region is equal to the product of the winding number of the point for the original region, with that for the clipping region. The product satisfies the rule that an area with a winding number of zero in either of the original shapes will have a winding number of zero in the result.

Figure 3A:
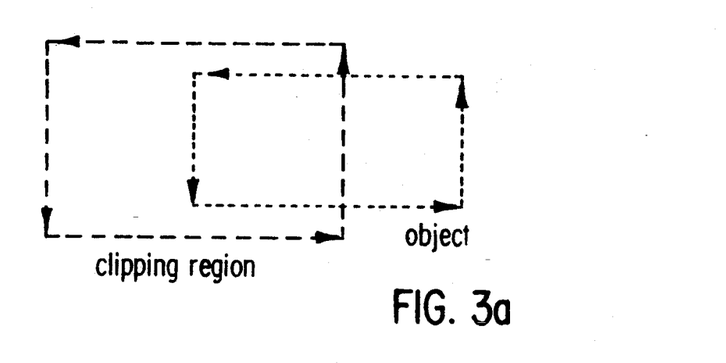
FIGS. 3A-3C illustrate a clipping procedure for a simple object and clipping region.
Figure 3B:
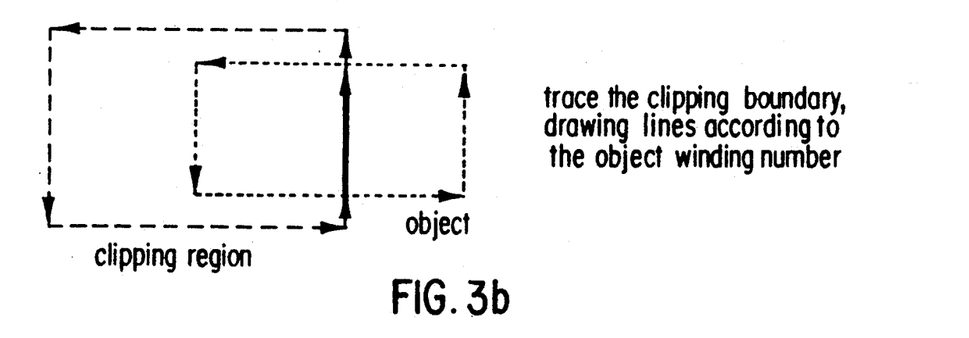
Figure 3C:
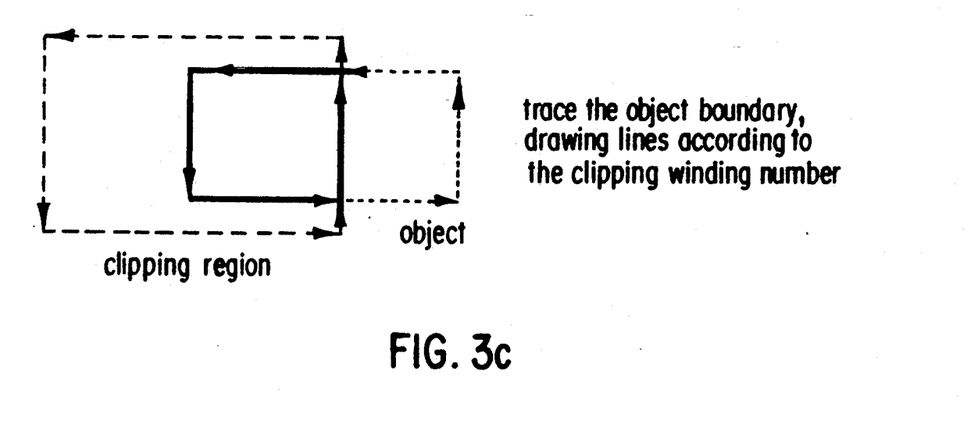
Figure 4A:
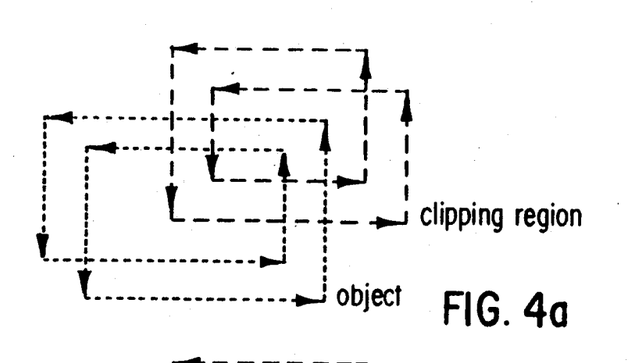
FIGS. 4A-4D illustrate a clipping procedure for a more complex object and clipping region.
Figure 4B:
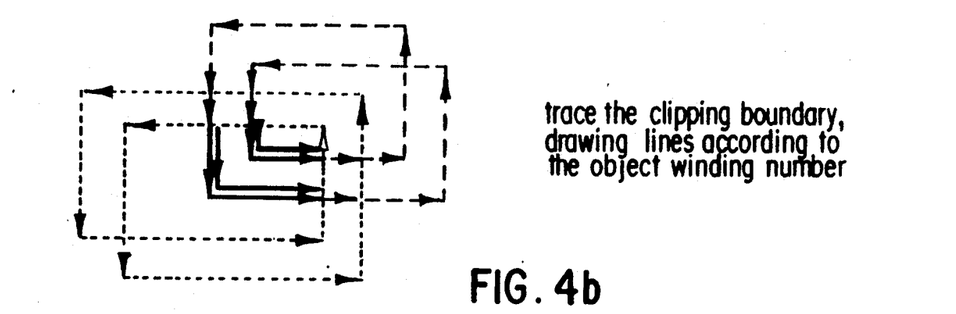
Figure 4C:
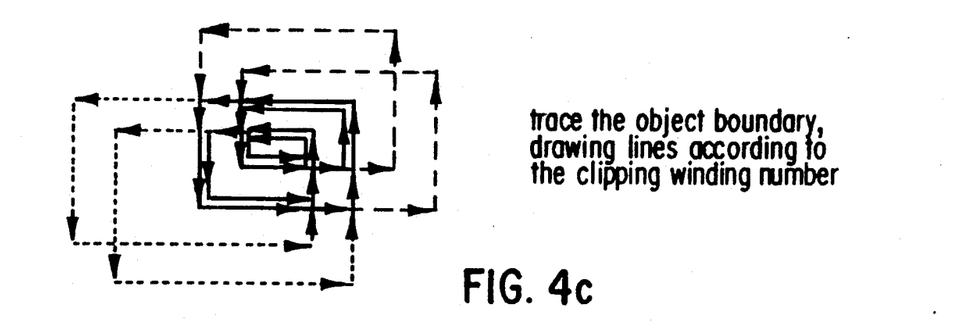
Figure 4D:
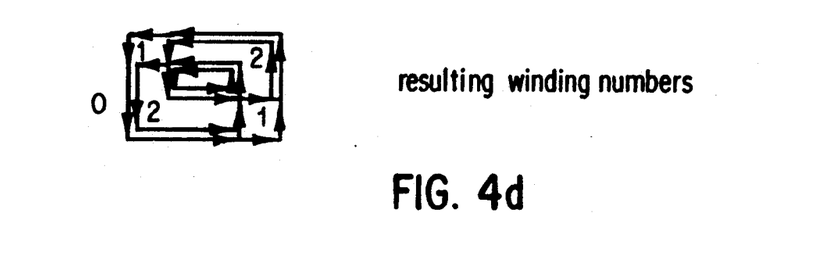

As illustrated in FIGS. 3a-3c, in the case of a single object and clipping region, a shape with the product winding numbers (the intersection polygon) can be simply constructed from the boundaries of the object and clipping shapes as follows:

1. Trace along the boundary of the clipping region, drawing edge lines for the clipped object. At each point in the trace, the number of edge lines drawn is equal to the winding number of the point, with respect to the original object.
2. Trace along the boundary of the original object, drawing edge lines for this object. At each point in the trace, the number of edge lines drawn is equal to the winding number of the point, with respect to the clipping region.

More complex object and clipping regions are illustrated in FIGS. 4a-4d.

Figure 5:
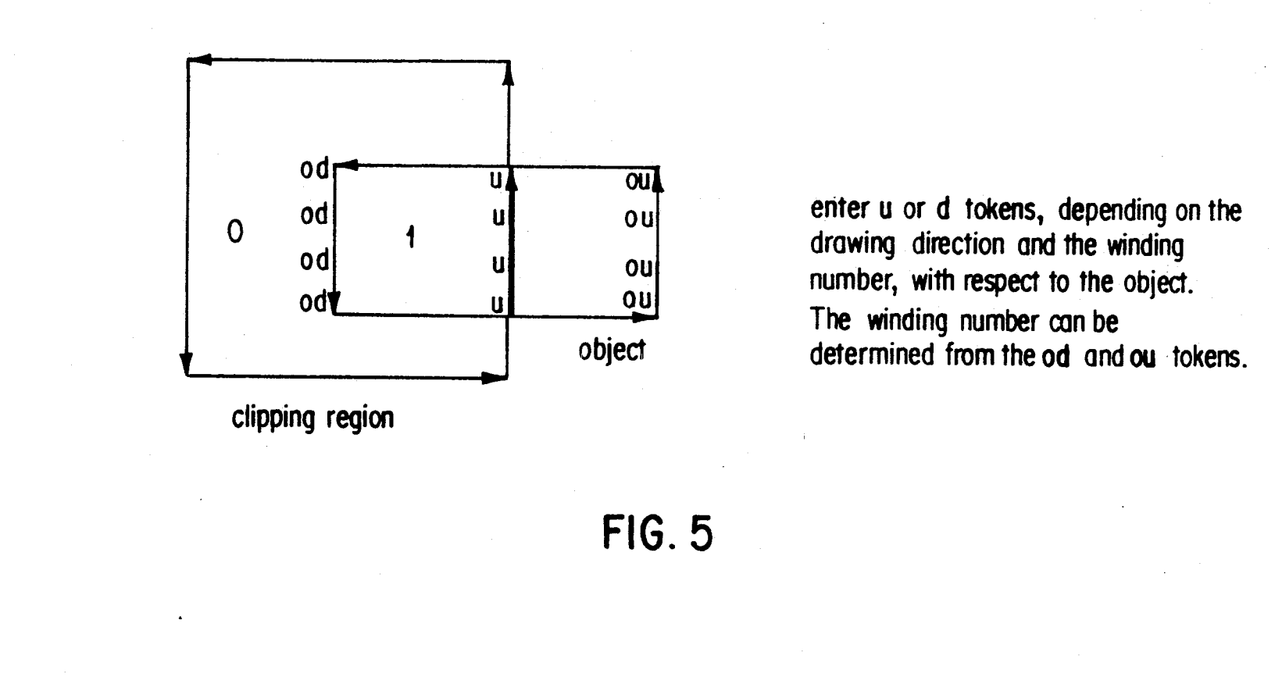
FIG. 5 illustrates the entry of edge tokens with respect to an object.

In implementing the clipping scheme, the ability to trace along the boundaries of the object and clipping region is required as well as the determination of the winding numbers of points, with respect to these regions The implementation will be described based on the extended frame buffer. The extended frame buffer is used not only to receive the result of the clipping process, but also in the determination of winding numbers during the construction process. In the extended frame buffer, a set of entries can be associated with each pixel such that there is one entry for each nonhorizontal edge passing through the pixel (assuming horizontal scanlines). Each entry describes the direction of the edge (up or down) and the type of edge (clipping region, unclipped object, clipped object). A direction number of +1 for a downward edge and -1 for an upward edge can be derived from each entry used in determining winding numbers. The winding number for a point is the sum of the direction numbers for the edges crossed by a line from the point to some distance point beyond any of the regions. It is assumed that the original object and clipping region lie entirely within the frame buffer, and can be entered into it (this can always be achieved by clamping coordinate values to the maximums and minimums allowed by the frame buffer). Once a polygon is entered into the frame buffer, the winding number can be determined at any pixel by stepping along its scanline, from the boundary to the pixel, and summing the direction numbers for edges encountered. If stepping from the left boundary, then a downward edge (d token) increments the count, and an upward edge (u token) decrements it. By entering the original object using some distinguished states (od and ou) the invention steps along the clipping boundary, and for each pixel determines its winding number with respect to the object. A number of edge tokens at that pixel can be entered to match its winding number, as illustrated in FIG. 5.

Figure 6:
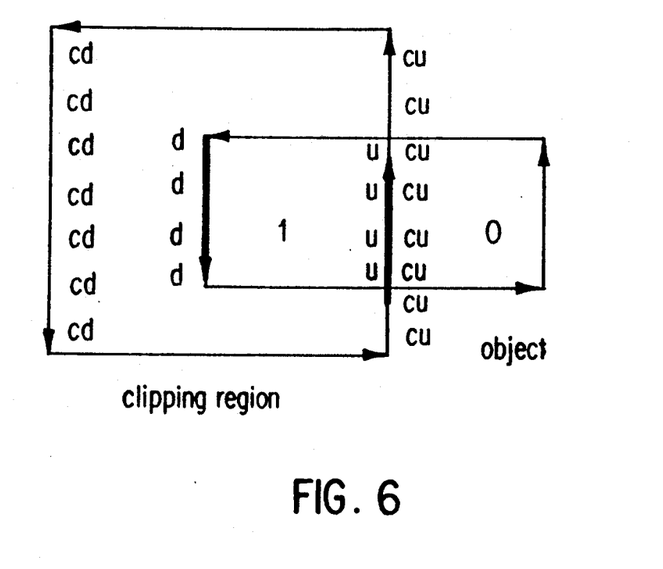
FIG. 6 illustrates the determination of the clipping winding number for each pixel.

Similarly, by entering the clipping region using distinguished states, the invention can step along the object and determine the clipping winding number for each pixel. This number can be used to specify the number of edge tokens to enter as illustrated in FIG. 6.

Figure 7:
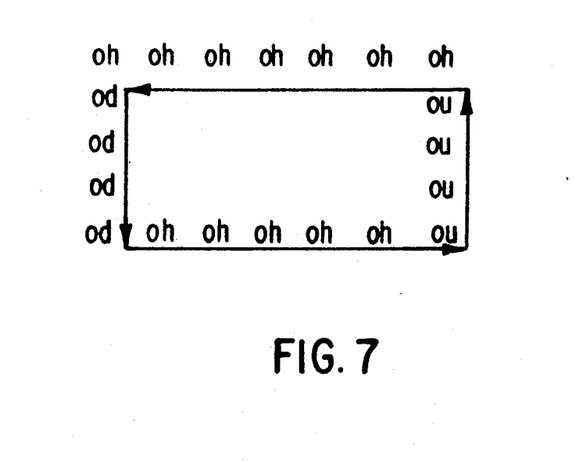
FIG. 7 illustrates pixel entries for an original object.
Figure 8A:
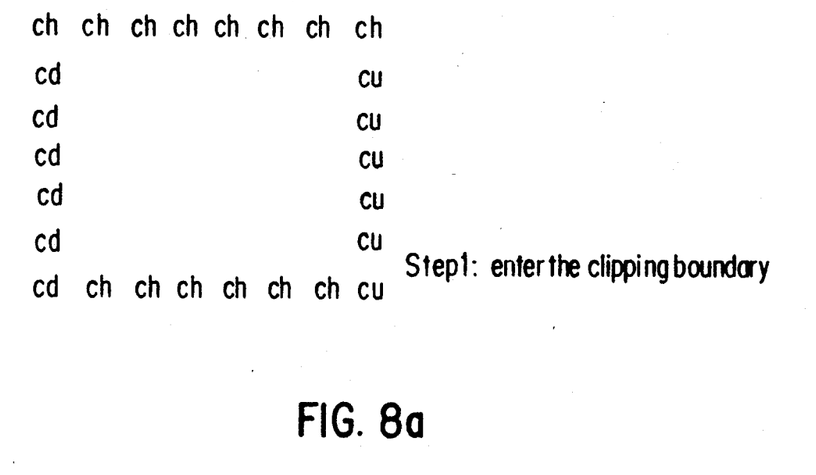
FIGS. 8A-8E illustrate the steps involved in the clipping operation.
Figure 8B:
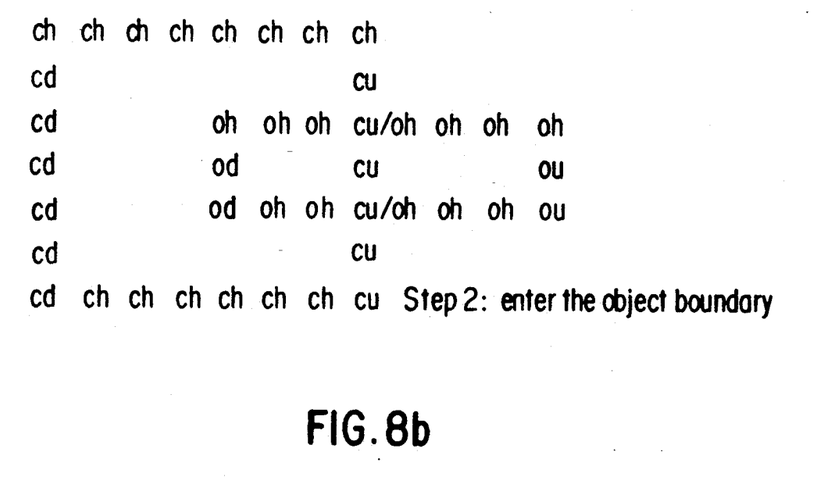
Figure 8C:
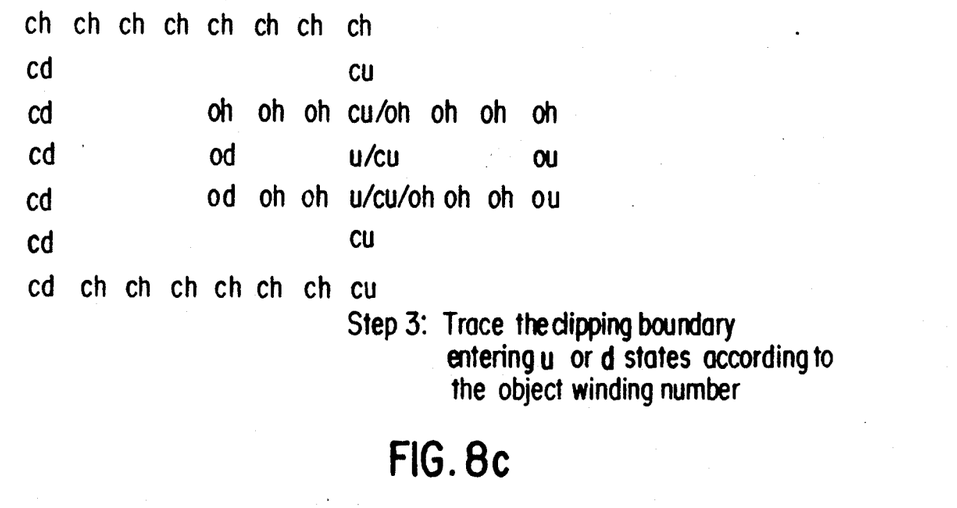
Figure 8D:
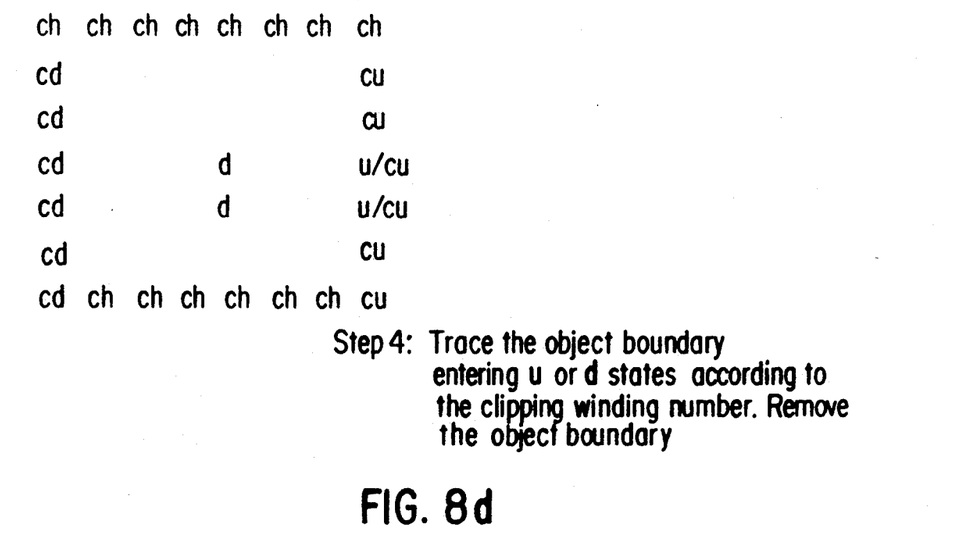
Figure 8E:
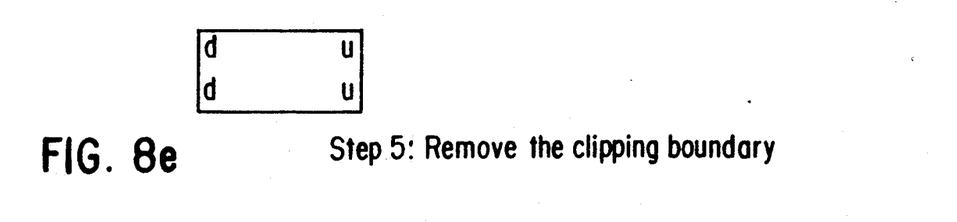

As described thus far, the determination of the winding number at each pixel as required. This is an expensive process and fortunately unnecessary. The winding number at a pixel is almost always the same as that for the previous pixel. The winding number only changes when a polygon boundary is crossed. It can easily be determined when this might happen. The implementation assumes the winding number is the same as that for the last pixel, unless the current pixel touches the polygon boundary (or the previous pixel touched the boundary). For the pixels where change might occur, the winding number is explicitly determined. In order to find points where the polygon boundary is crossed, the invention must recognize not only left and right edges, but horizontal ones as well. To do this, a further pixel entry is introduced to mark horizontal boundaries. (Actually, two new state tokens are introduced; one for horizontal edges of the original object oh, and one for horizontal edges of the clipping region ch.) The entry for the original object would look as shown in FIG. 7.

To insert edges arising from the clipping region, the clipping region boundary is traced. The winding number is determined for the first pixel, then the boundary is stepped along. Each pixel is checked for an od, ou, or oh state. If found, or if one was found on the previous pixel of the boundary, then the winding number is explicitly determined. Otherwise, the winding number is taken to be the same as that for the previous boundary pixel. The current drawing direction (up or down) is used to determine whether u or d states should be entered, and the winding number indicates how many states should be entered into the frame buffer. The same process, with the roles of object and clipping regions reversed, is used to insert edges arising from the original object boundary. The overall process as illustrated in FIGS. 8a–8e has five stages:

1. the clipping region boundary using the distinguished states cd, cu, and ch. This single entry will serve for clipping many objects to the same clipping region.
2. Enter the object boundary using the distinguished states od, ou, and oh.
3. Determine the object winding number for the first clipping-boundary pixel, and step along the clipping-region boundary. Examine each pixel to see if it touches the object boundary (od, ou, or oh state), and if it or the previous pixel does, explicitly determine the object winding number. Enter u or d tokens according to the current stepping direction. Enter as many tokens for the pixel as the current winding number.
4. Determine the clipping winding number of the first object-boundary pixel, and step along the object boundary. For each pixel, remove the od, ou, and oh states. Examine the pixel to see if it touches the clipping boundary (cd, cu, or ch states), and if it or the previous pixel does, explicitly determine the clipping winding number. Enter u or d tokens according to the current stepping direction. Enter as many tokens for the pixel as the current winding number.
5. When all clipped objects have been entered, step through the clipping boundary, removing the cd, cu, and ch states.

The time required for processing is proportional to the lengths of the boundaries. Each object is traced twice—once to enter it using the distinguished states, and a second time to remove it and insert the final edges arising from it. Also, for each object, the clipping boundary is traced once. This generates the edges arising from the clipping boundary. The clipping boundary must also be traversed to enter it into the frame buffer and to remove it, but a single entry can be used to clip many objects.

The overall number of states required depends upon the implementation. The minimum number of states used, with the approximate approach of copending U.S. patent application Ser. No. 07/363,827 is 8. They are:
b—background
u—up
d—down
cu—clip up
cd—clip down
ou—object up
od—object down
h—horizontal In this case, a single horizontal state is used for both the object and clipping region. This means that a touch may be indicated where none actually exists (an object's intersection with its own horizontal boundary cannot be distinguished from an intersection with the clipping region). As a result, winding numbers may be explicitly calculated more often than necessary, which will impact performance. However, the ambiguity does not introduce any errors into the image. One might expect these cases to be rare, and the benefit is the reduction of the number of states a power of two.

If the exact buffer representation of the copending U.S. patent application Ser. No. 07/363,827 is used, then 8 states are not sufficient. The states needed are:
b—background
(—start of list
)—end of list
u—up
d—down
cu—clip up
cd—clip down
ch—clip horizontal
ou—object up
od—object down
oh—object horizontal There are at least two exact representation schemes which use 16 states (another power of two), and require only one pixel state entry per edge per scanline for the final frame buffer image.

Scheme A
b—background
(—start of list
)—end of list
u—up
d—down
cu—clip up
cd—clip down
ou—object up
od—object down
h—horizontal
(u)—up list (d)—down list
(u—start of up list
(d—start of down list
u)—end of up list
d)—end of down list
Scheme B
b—background
(—start of list
)—end of list
u—up
d—down
cu—clip up
cd—clip down
ch—clip horizontal
ou—object up
od—object down
oh—object horizontal
(u)—up list
(d)—down list
(u—start of up list
(d—start of down list
x)—end of list with element In order to represent every information element, 17 states are preferable, however, 16 will suffice. In scheme A, the technique of combining the two horizontal markers ch and oh into a single horizontal state has been used. In scheme B, the two list ending states u) and d) have been replaced with the single x) state, indicating an element and the end of the list. This can be done because up and down states in a list can be cancelled, leaving strictly up elements or down elements in a list, but not both. If this is done, then the type of the last element [u) or d)] will match the type of the first element. By using the full 16 states, it is possible to eliminate the overhead of parentheses pixels in the final frame buffer representation of the image.

Figure 9A:
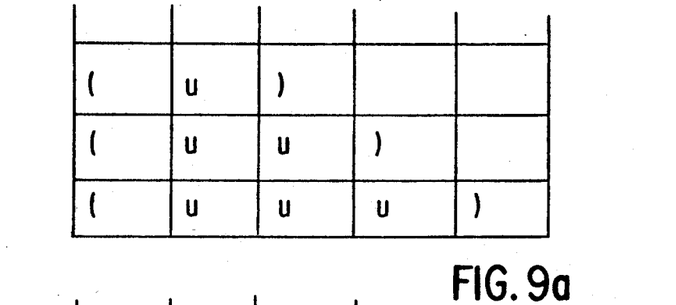
FIGS. 9A-9C illustrate frame buffer storage reduction in a final frame buffer image.
Figure 9B:
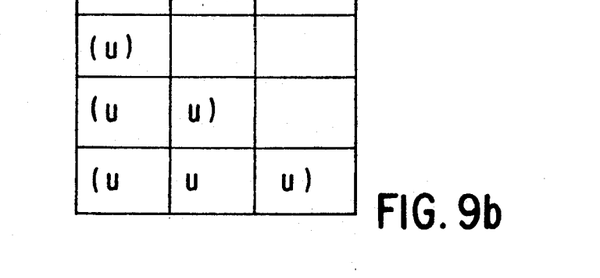
Figure 9C:
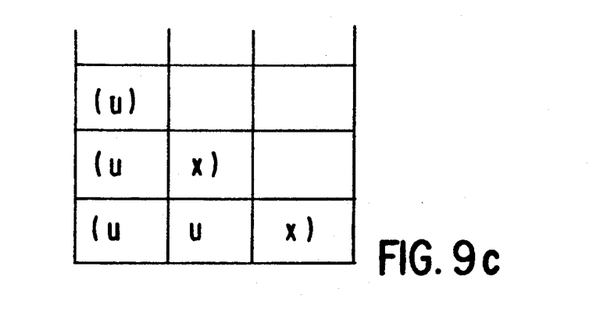

The lists of FIG. 9a can be reduced in scheme A to the lists of FIG. 9b or in scheme B to the lists of FIGS. 9c. This requires only a single pixel of the frame buffer per edge scanline.

This clipping scheme can be merged with techniques to convert from odd winding number conventions to non-zero winding number representations. Conversion from odd to non-zero winding numbers is described in copending U.S. patent application Ser. No. 07/574,143 the disclosure of which is incorporated by reference. The method can be summarized as follows:
1. Enter the shape into the buffer using distinguished states (odd and horizontal), noting scanlines where the boundary may cross itself.
2. Determine the appropriate directions for edges in the neighborhood where the boundary touches itself.
3. Trace the boundary again, replacing the distinguished states with the appropriate up and down states.

This process can be combined with the clipping method to yield an overall scheme for entering clipped shapes defined by an odd winding number. The method is outlined as follows:
1. Enter the clipping boundary using distinguished clip states (cd, cu, and ch).
2. Enter the object into the frame buffer using distinguished states (odd=od, horizontal=oh), noting scanlines containing pixels where the boundary may cross itself (special scanlines).
3. Determine the object winding number for the first clipping boundary pixel (1 if odd winding number, 0 if even) and step through the clipping-region boundary. Examine each pixel to see if it touches the object boundary (odd or horizontal); if it or the previous pixel does, explicitly determine the object winding number (1 if odd, 0 if even). Enter u or d states, according to the current stepping direction, provided the current winding number is 1.
4. Determine appropriate directions for edges in the neighborhood where the object boundary touches itself (special scanlines) and replace odd states with the down or up states od or ou.
5. Determine the clipping winding number of the first object-boundary pixel and step through the object boundary. Examine the pixel to see if it touches the clipping boundary (cd, cu, or ch states); if it or the previous pixel does, explicitly determine the clipping winding number. Enter u or d states. On special scanlines the appropriate direction is given by whether there is an od or ou entry in the frame buffer; otherwise, the direction is the same as that for the previous pixel. For each pixel remove the distinguished od, ou, and oh states. Enter as many states as the current clipping winding number.
6. When all clipped objects have been entered, step through the clipping boundary, removing the cd, cu, and ch states.

Figure 10:
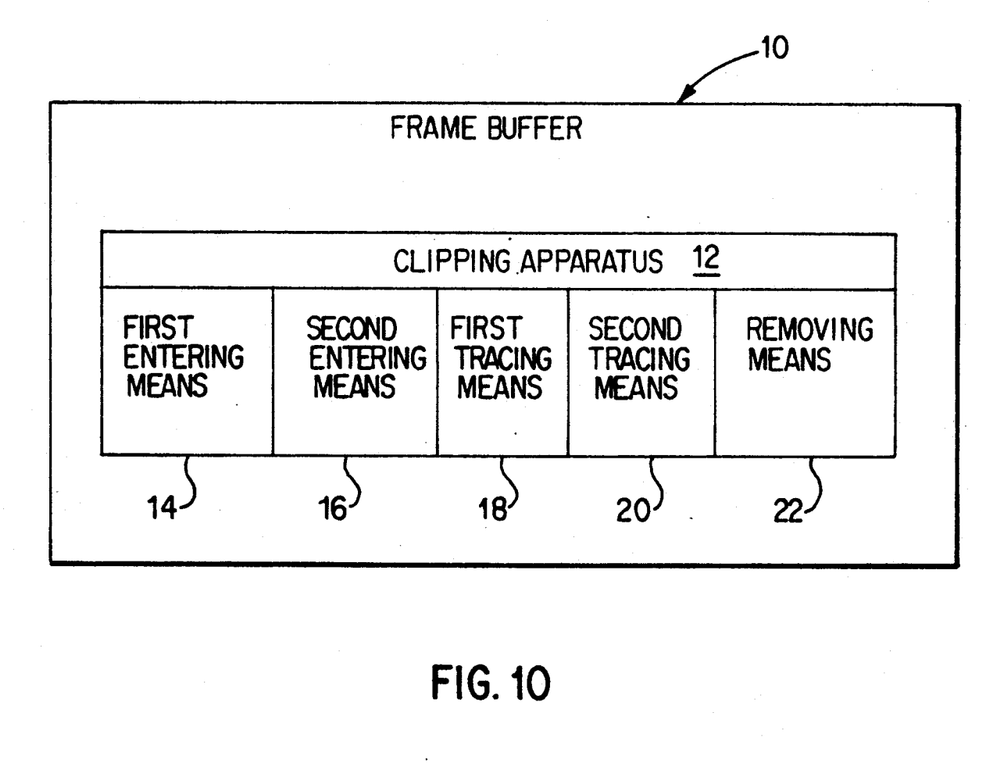
FIG. 10 illustrates a block diagram of a frame buffer which performs the clipping operation.

FIG. 10 illustrates a frame buffer 10 which can perform the above-described clipping operation using clipping apparatus 12. Clipping apparatus 12 includes a first entering means 14 for entering a clipping region boundary using distinguished states. Second entering means 16 enters an object boundary using different distinguished states. First tracing means 18 traces the clipping region boundary and enters states according to the object winding number. Second tracing means 20 traces the object boundary and enters states according to the clipping winding number. Removing means 22 removes the clipping region boundary.

The clipping requires 3 or 4 bits per pixel, and the performance is resolution dependent (although it varies only linearly with resolution). It offers several advantages over previous methods. It is fairly simple and fast and can be implemented in hardware. It is consistent with the extended frame buffer scheme for fast imaging of generalized polygons. It applies to any boundary shape which can be generated sequentially, and it can be used with shapes defined by a non-zero winding number. The clipping scheme is particularly useful in the implementation of page description languages.

While this invention has been described in conjunction with specific embodiments thereof, it is evident that many alternatives, modifications and variations would be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:
1. A method of clipping regions in computer graphics, the method comprising the steps of:
   entering a clipping region boundary using distinguished states;
   entering an object boundary using distinguished states different from the distinguished states used in entering the clipping region boundary;
   tracing the clipping region boundary and entering states according to an object winding number;

tracing the object boundary and entering states according to a clipping winding number;
removing the object boundary distinguished states; and
removing the clipping region boundary distinguished states.

2. The method as recited in claim 1, wherein said clipping region boundary tracing step includes the steps of:
   a) determining the object winding number for a first clipping boundary pixel;
   b) stepping along the clipping region boundary;
   c) examining each stepped clipping boundary pixel to determine if said each stepped clipping boundary pixel touches the object boundary, and, if said each stepped clipping boundary pixel or a previous pixel touches the object boundary, determining the object winding number; and
   d) entering tokens according to a current stepping direction, the number of tokens for each pixel being the current object winding number.

3. The method as recited in claim 1, wherein said object boundary tracing step includes:
   a) determining the clipping winding number of a first object boundary pixel;
   b) stepping along the object boundary;
   c) for each stepped object boundary pixel, removing the object boundary distinguished states;
   d) examining each stepped object boundary pixel to determine if each said stepped object boundary pixel touches the clipping region boundary and, each said stepped object boundary pixel or a previous pixel touches the clipping region boundary, determining the clipping winding number; and
   e) entering tokens according to a current stepping direction, the number of tokens for each pixel being the current clipping winding number.

4. A frame buffer apparatus for clipping regions in computer graphics comprising:
   first entering means for entering a clipping region boundary using distinguished states;
   second entering means for entering an object boundary using distinguished states different from the distinguished states used in entering the clipping region boundary;
   first tracing means for tracing the clipping region boundary and entering states according to an object winding number;
   second tracing means for tracing the object boundary and entering states according to a clipping winding number; and
   removing means for removing the clipping region boundary distinguished states.

* * * * *